Patented Oct. 6, 1925.

1,556,347

UNITED STATES PATENT OFFICE.

GEORGE W. PRESSELL, OF PHILADELPHIA, PENNSYLVANIA, ASSIGNOR TO E. F. HOUGHTON & COMPANY, OF PHILADELPHIA, PENNSYLVANIA, A CORPORATION OF PENNSYLVANIA.

CARBURIZING MATERIAL.

No Drawing.     Application filed March 13, 1924.   Serial No. 699,150.

*To all whom it may concern:*

Be it known that I, GEORGE W. PRESSELL, a citizen of the United States, residing in Philadelphia, Pennsylvania, have invented a Carburizing Material, of which the following is a specification.

The principal object of my invention is to provide a novel carburizing material possessing exceptionally high carburizing value, and which, by reason of certain inherent characteristics, is particularly valuable as an energizer either for accelerating and intensifying the action of substances which in themselves possess case hardening properties; or for rendering active as carburizers carbonaceous substances, such as coke, which in themselves have little or no case hardening properties; or for re-energizing spent carburizing materials.

A further object of my invention is to provide an energizer as above set forth which is practically permanent.

The invention further resides in the provision of a novel carburizing compound utilizing for one of its constituents the aforesaid material.

My carburizing material may be obtained as a product incidental to the process of producing alkali metal cyanides and derivatives thereof and, in particular, to the process of producing these cyanides and derivatives disclosed in U. S. Patent No. 1,473,826.

In this process, an alkali metal carbonate or oxide, carbon and iron are brought together in a suitable reaction chamber and are subjected at a predetermined temperature to the action of nitrogenous gases. At the completion of this treatment a granular product is obtained high in carbon content and containing cyanide, and exceptionally well adapted both in form and chemical composition for carburizing purposes.

A characteristic reaction-chamber charge may consist in a mixture comprising approximately forty-two parts of sodium carbonate, fifty-six parts of coke, and a quantity of iron equivalent to 2% of the weight of the charge in the form of iron oxide. The furnace is preferably thoroughly heated before the charge is inserted, and after insertion the charge is brought to the reaction temperature, approximately red heat, before the nitrogen is introduced. As the nitrogenous gas, flue gas may be employed washed to remove the carbon dioxide and containing after washing approximately 96% of nitrogen.

Characteristic samples of materials obtained through this process and successfully used show the following formulas:

|  | Sample 1. | Sample 2. |
|---|---|---|
| Sodium cyanide | 18.0 | 5.0 |
| Sodium carbonate | 19.3 | 34.9 |
| Sodium ferrocyanide | 6.0 | 5.8 |
| Sodium silicate | 6.9 | 2.3 |
| Iron and alumina | 5.9 | 6.2 |
| Calcium carbonate | 2.2 | 2.2 |
| Carbon | 31.7 | 32.4 |
| Moisture | 2.6 | 1.0 |

The carbonaceous matter is thoroughly impregnated with the sodium cyanide and cyanamid, these latter with the carbon constituting the active carburizing agents and the sodium carbonate functioning as an energizer.

The material is in granular form and retains its granular form when used for carburizing purposes. It possesses exceptionally high carburizing value, and is particularly useful as an energizer in conjunction with other materials. I have found it possible, for example, to use 10% to 20% of this carbonaceous material in conjunction with 80% to 90% of a mixture of charcoal and coke, the latter mixture being thus energized to the same or greater extent, and the same or greater carburizing value being obtained, as when the charcoal-coke mixture is energized with such energizers as the carbonates of barium, sodium, and calcium. With the new material, however, it is unnecessary to re-energize the coke and charcoal, inasmuch as said material possesses sufficiently high carburizing value that the gases liberated from this product at carburizing temperatures sufficiently energize the coke and charcoal to produce the desired carburizing results. As an energizer for materials such as coke and charcoal which alone are practically inert and have little carburizing value, the new material is especially valuable, since satisfactory results may be obtained by merely blending the materials together which eliminates the expensive operation of impregnating or smearing the surface of the grains of coke, charcoal or like material with the energizer, as is customary where the common energizers are employed.

The material is also valuable for intensifying the action of such active carburizers as bone and charred leather, and for re-energizing the substances after they have lost their effectiveness in previous operations.

However used, the material may be simply mixed with the carbonaceous base substance in amounts varying in accordance with particular requirements. For ordinary purposes, the material may constitute from 5% to 25% of the mixture, although I do not wish to limit myself in this respect.

The material recommends itself particularly for use as an energizer both on account of the ease of preparing the ultimate carburizing composition, and because of the comparative cheapness of the very effective carburizing composition obtained.

The process of manufacture may vary. Considerable latitude is given in the selection of the base materials both as to form and relative quantities. The carbon, for example, obviously need not be in the form of coke, and the alkali metal salts are not confined to those of sodium. The length of the reaction period also may vary and will be controlled largely by the relative amount of cyanide desired in the furnace product. The nitrogen, passed in a stream through the reaction chamber, is fixed as cyanide, and the amount of cyanide in the furnace product accordingly depends on the length of the reaction.

Obviously, also, a product containing the essential ingredients of the carburizer may be obtained by other processes, and the invention is not to be limited to any particular process of manufacture. Nor is there any limitation in the proportions of these ingredients in the product, since these may be largely varied to suit the particular work for which the carburizer is intended.

I claim:

1. A carburizing composition comprising a carbonaceous material energized with carbon impregnated with an alkali metal cyanide.

2. A carburizing composition comprising a mixture of a carbonaceous material with carbon impregnated with an alkali metal cyanide.

3. A carburizing composition comprising a mixture of a carbonaceous material with carbon impregnated with an alkali metal cyanide and combined with an alkali metal carbonate.

4. A carburizing composition comprising carbonaceous material and carbon impregnated with an alkali metal cyanide, the said impregnated carbon constituting not more than 25% of the composition.

5. The method of re-energizing spent carburizing materials, which consists in mixing therewith a material comprising carbon impregnated with an alkali metal cyanide.

6. The method of intensifying carburizing materials, which consists in mixing therewith a material comprising carbon impregnated with an alkali metal cyanide.

7. The method of forming carburizing materials, which consists in adding to carbonaceous materials which in themselves are practically inert for carburizing purposes a material comprising carbon impregnated with an alkali metal cyanide.

8. A carburizing composition comprising a carbonaceous substance and carbon impregnated with a compound of cyanide with an alkali metal.

9. A carburizing material comprising coke and carbon impregnated with a compound of cyanide with an alkali metal.

10. A carburizing material comprising charcoal and carbon impregnated with a compound of cyanide with an alkali metal.

11. A carburizing material comprising coke and carbon impregnated with sodium cyanide.

12. A carburizing material comprising coke, charcoal, and carbon impregnated with an alkali metal cyanide.

13. A carburizing material comprising 80% to 90% of a mixture of coke and charcoal, and 10% to 20% of carbon impregnated with a compound of cyanide with an alkali metal.

14. A carburizing material comprising 80% to 90% of carbonaceous substance, and 10% to 20% of carbon impregnated with an alkali metal cyanide.

GEORGE W. PRESSELL.